United States Patent
Ku et al.

(10) Patent No.: US 10,050,663 B1
(45) Date of Patent: Aug. 14, 2018

(54) METHOD AND APPARATUS FOR CANCELING SELF-INTERFERENCE IN WIRELESS COMMUNICATION SYSTEM

(71) Applicant: LG ELECTRONICS INC., Seoul (KR)

(72) Inventors: Gwanmo Ku, Seoul (KR); Sangrim Lee, Seoul (KR); Dongkyu Kim, Seoul (KR); Sangwook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/629,524

(22) Filed: Jun. 21, 2017

(51) Int. Cl.
| | |
|---|---|
| *H04B 1/525* | (2015.01) |
| *H04W 52/02* | (2009.01) |
| *H04L 5/14* | (2006.01) |
| *H04B 1/04* | (2006.01) |
| *H04B 1/48* | (2006.01) |

(52) U.S. Cl.
CPC ............ *H04B 1/525* (2013.01); *H04B 1/0475* (2013.01); *H04L 5/14* (2013.01); *H04B 2001/485* (2013.01)

(58) Field of Classification Search
CPC ........ H04B 1/525; H04B 1/0475; H04B 1/10; H04B 2001/7152; H04B 15/00; H04W 52/0238; H04L 5/14
See application file for complete search history.

(56) References Cited

U.S. PATENT DOCUMENTS

| | | | | |
|---|---|---|---|---|
| 2005/0195889 | A1* | 9/2005 | Grant ..................... | H04B 1/707 375/148 |
| 2015/0043323 | A1* | 2/2015 | Choi ....................... | H04L 5/143 370/203 |
| 2015/0280893 | A1* | 10/2015 | Choi ....................... | H04B 1/525 370/281 |
| 2015/0382375 | A1* | 12/2015 | Bhushan ............... | H04L 5/0005 370/252 |
| 2017/0170948 | A1* | 6/2017 | Eltawil ................. | H04L 5/1461 |
| 2017/0179983 | A1* | 6/2017 | Choi ..................... | H04B 1/0475 |
| 2017/0187513 | A9* | 6/2017 | Bharadia ............... | H04L 5/1461 |
| 2017/0207812 | A1* | 7/2017 | Wyville ................ | H04B 1/525 |
| 2017/0353212 | A1* | 12/2017 | Bharadia ................ | H04B 1/525 |
| 2018/0006794 | A1* | 1/2018 | Lee ....................... | H04B 15/00 |

* cited by examiner

*Primary Examiner* — Andrew Wendell
(74) *Attorney, Agent, or Firm* — Lee, Hong, Degerman, Kang & Waimey

(57) ABSTRACT

A method of a UE for canceling a self-interference (SI) signal in a wireless communication system is disclosed. The method comprises the steps of generating a signal related to transmission data by means of a UE operating in a full duplex radio (FDR) mode; transmitting the signal related to transmission data; receiving a signal related to reception data by means of the UE; and canceling the SI signal on the basis of the signal related to transmission data and the signal related to reception data. In this case, a cancellation signal is further generated from the signal related to transmission data on the basis of a previously set value of a power amplifier (PA), and the SI signal is canceled by further reflecting the generated cancellation signal.

20 Claims, 17 Drawing Sheets

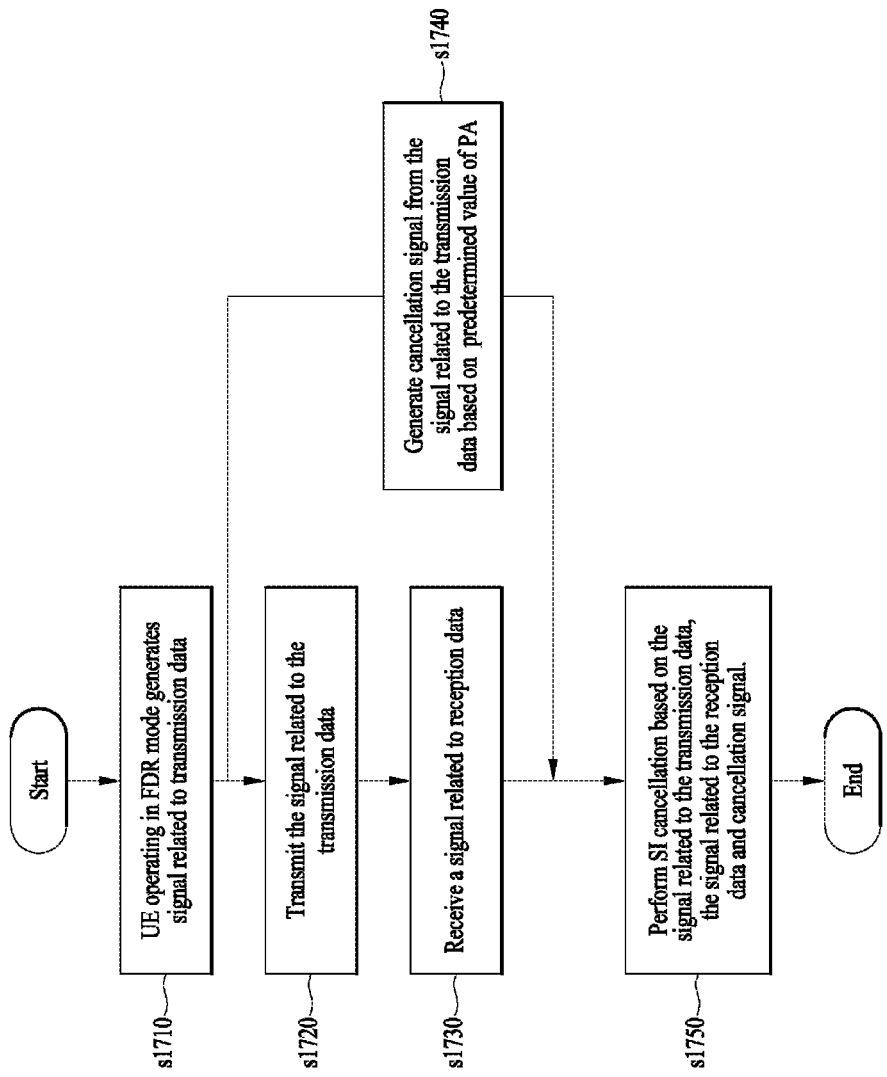

METHOD AND APPARATUS FOR
CANCELING SELF-INTERFERENCE IN
WIRELESS COMMUNICATION SYSTEM

BACKGROUND OF THE INVENTION

Field of the Invention

The present invention relates to a wireless communication system, and more particularly, to a method and apparatus for canceling self-interference (SI).

Discussion of the Related Art

Compared to conventional half duplex communication in which time or frequency resources are divided orthogonally, full duplex communication doubles a system capacity in theory by allowing a node to perform transmission and reception simultaneously.

FIG. 1 is a conceptual view of a UE and a Base Station (BS) which support Full Duplex Radio (FDR).

In the FDR situation illustrated in FIG. 1, the following three types of interference are produced.

Intra-Device Self-Interference:

Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE Inter-Link Interference:

An Uplink (UL) signal transmitted by a UE is received at an adjacent UE and thus serves as interference.

BS to BS Inter-Link Interference:

The BS to BS inter-link interference refers to interference caused by signals that are transmitted between BSs or heterogeneous BSs (pico, femto, and relay) in a HetNet state and received by an Rx antenna of another BS.

SUMMARY OF THE INVENTION

Accordingly, the present invention is directed to a method and apparatus for canceling self-interference in a wireless communication system, which substantially obviate one or more problems due to limitations and disadvantages of the related art.

An object of the present invention is to provide a method of a UE for canceling self-interference in a wireless communication system.

Another object of the present invention is to provide a method for canceling self-interference in an FDR status.

Still another object of the present invention is to provide a method for canceling self-interference considering a power amplifier (PA).

Further still another object of the present invention is to provide a method for canceling self-interference considering nonlinearity.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

In accordance with one embodiment of the present specification, a method of a UE for canceling a self-interference (SI) signal in a wireless communication system, the method comprising: generating a signal related to transmission data by means of a UE operating in a full duplex radio (FDR) mode; transmitting the signal related to transmission data; receiving a signal related to reception data by means of the UE; and canceling the SI signal on the basis of the signal related to transmission data and the signal related to reception data, wherein a cancellation signal is further generated from the signal related to transmission data on the basis of a previously set value of a power amplifier (PA), and the SI signal is canceled by further reflecting the generated cancellation signal.

In accordance with one embodiment of the present specification, a UE operating in a full duplex radio (FDR) mode and canceling a self-interference (SI) signal in a wireless communication system, the UE comprising: a reception module receiving a signal; a transmission module transmitting a signal; a processor controlling the reception module and the transmission module, wherein the processor generates a signal related to transmission data, transmits the signal related to transmission data by using the transmission module, receives a signal related to reception data by using the reception module, and cancels the SI signal on the basis of the signal related to transmission data and the signal related to reception data, and wherein the processor further generates a cancellation signal from the generated signal related to transmission data on the basis of a previously set value of a power amplifier (PA), and cancels the SI signal by further reflecting the generated cancellation signal.

Also, the followings may commonly be applied to the method and apparatus for canceling self-interference in a wireless communication system.

In accordance with one embodiment of the present specification, the SI signal is canceled in a time domain.

In accordance with one embodiment of the present specification, fast fourier transform (FFT) processing is further performed for the cancellation signal.

In accordance with one embodiment of the present specification, the SI signal is canceled in a frequency domain on the basis of the cancellation signal for which FFT processing is further performed.

In accordance with one embodiment of the present specification, further comprising the step of performing error estimation for the cancellation signal.

In accordance with one embodiment of the present specification, the cancellation signal is updated on the basis of the error estimation.

In accordance with one embodiment of the present specification, the SI cancellation is applied to a multicarrier system.

In accordance with one embodiment of the present specification, the cancellation signal is generated for each subcarrier, and the SI signal is canceled in the frequency domain on the basis of the cancellation signal for each subcarrier.

In accordance with one embodiment of the present specification, the previously set value of the power amplifier is given by a datasheet of the power amplifier.

In accordance with one embodiment of the present specification, the previously set value of the power amplifier is given based on parameters of the power amplifier.

In the present specification, a method of a UE for canceling self-interference in a wireless communication system may be provided.

In the present specification, a method for canceling self-interference in an FDR status may be provided.

In the present specification, a method for canceling self-interference considering a power amplifier (PA) may be provided.

In the present specification, a method for canceling self-interference considering nonlinearity may be provided.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 17 is a flow chart illustrating a method for performing SI cancellation.

DETAILED DESCRIPTION OF THE PREFERRED EMBODIMENTS

Figure 1:
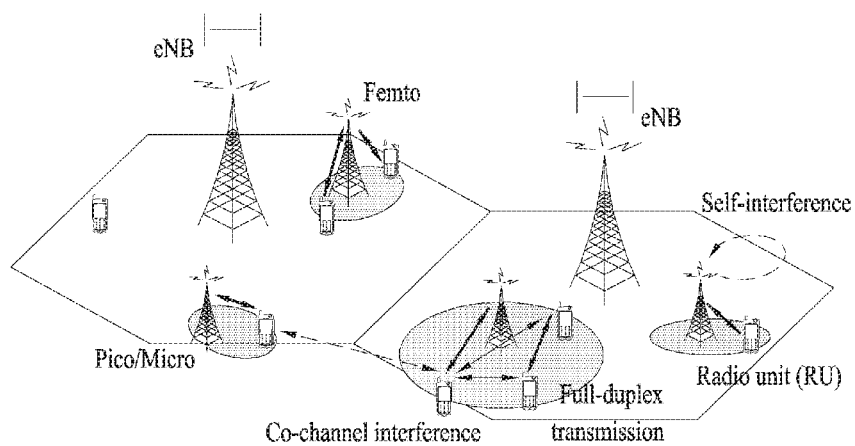
FIG. 1 is a view illustrating an exemplary network supporting half-duplex/full-duplex communication of a User Equipment (UE), proposed by the present invention.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes a 3rd Generation Partnership Project (3GPP) Long Term Evolution (LTE) system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on 3GPP LTE system or 3GPP LTE-A system, contents of the present invention may be applicable to various kinds of other communication systems.

In a mobile communication system, a UE is able to receive information in Downlink (DL) and is able to transmit information in Uplink (UL) as well. Information transmitted or received by the UE may include various kinds of data and control information. In accordance with types and usages of the information transmitted or received by the UE, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio access (UTRA), CDMA 2000 and the like. TDMA can be implemented with such a radio technology as Global System for Mobile communications/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, E-UTRA (Evolved UTRA), etc. UTRA is a part of Universal Mobile Telecommunications System (UMTS). 3GPP LTE is a part of Evolved UMTS (E-UMTS) that uses E-UTRA. The 3GPP LTE employs OFDMA in DL and SC-FDMA in UL. And, LTE-A is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
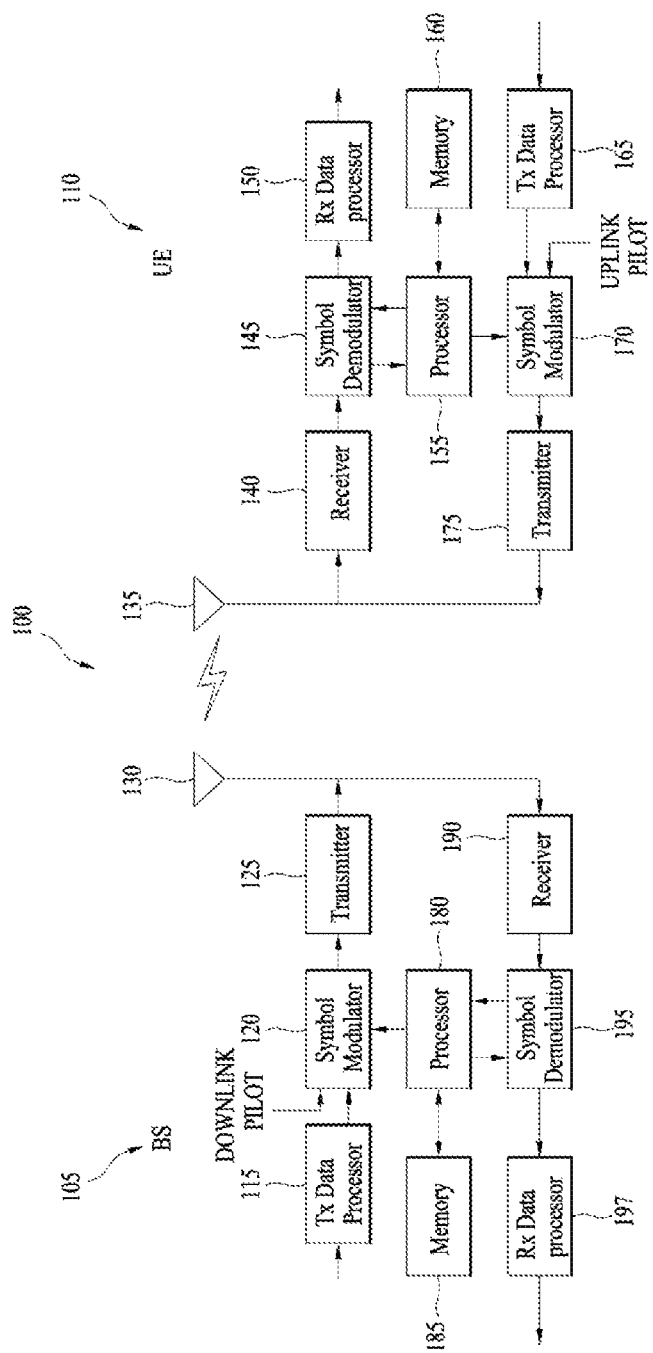
FIG. 2 is a block diagram of a Base Station (BS) and a UE in a wireless communication system.

FIG. 2 is a block diagram for configurations of a BS 105 and a UE 110 in a wireless communication system 100.

Although one BS 105 and one UE 110 (D2D UE included) are shown in the drawing to schematically represent the wireless communication system 100, the wireless communication system 100 may include at least one BS and/or at least one UE.

Referring to FIG. 2, the BS 105 may include a Transmission (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a Tx data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present invention supports a Multiple Input Multiple Output (MIMO) system. And, the BS 105 according to the present invention may support both Single User-MIMO (SU-MIMO) and Multi User-MIMO (MU-MIMO) systems.

In DL, the Tx data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the Tx data processor 115 in the BS 105, respectively.

In the UE 110 in UL, the Tx data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates a UL signal. This UL signal is then transmitted to the BS 105 via the antenna 135.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

According to the present invention, the PA may be used to amplify the signal in the transmitter 125/175. That is, the PA may be a hardware component for supporting the operation of the transmitter. At this time, as an example, control based on the PA may be performed by the aforementioned processor 155/180. Also, as an example, in respect of the operation of the aforementioned units (or modules) as well as the transmitter 125/175, the PA may be a hardware component and is not limited to the aforementioned embodiment. That is, in respect of the operations of the UE 110 and the BS 105, the PA may be operated as a hardware component. For example, the present invention discloses a method for canceling nonlinearity caused by the PA related to the operation configuration, which will be described later.

Figure 3:
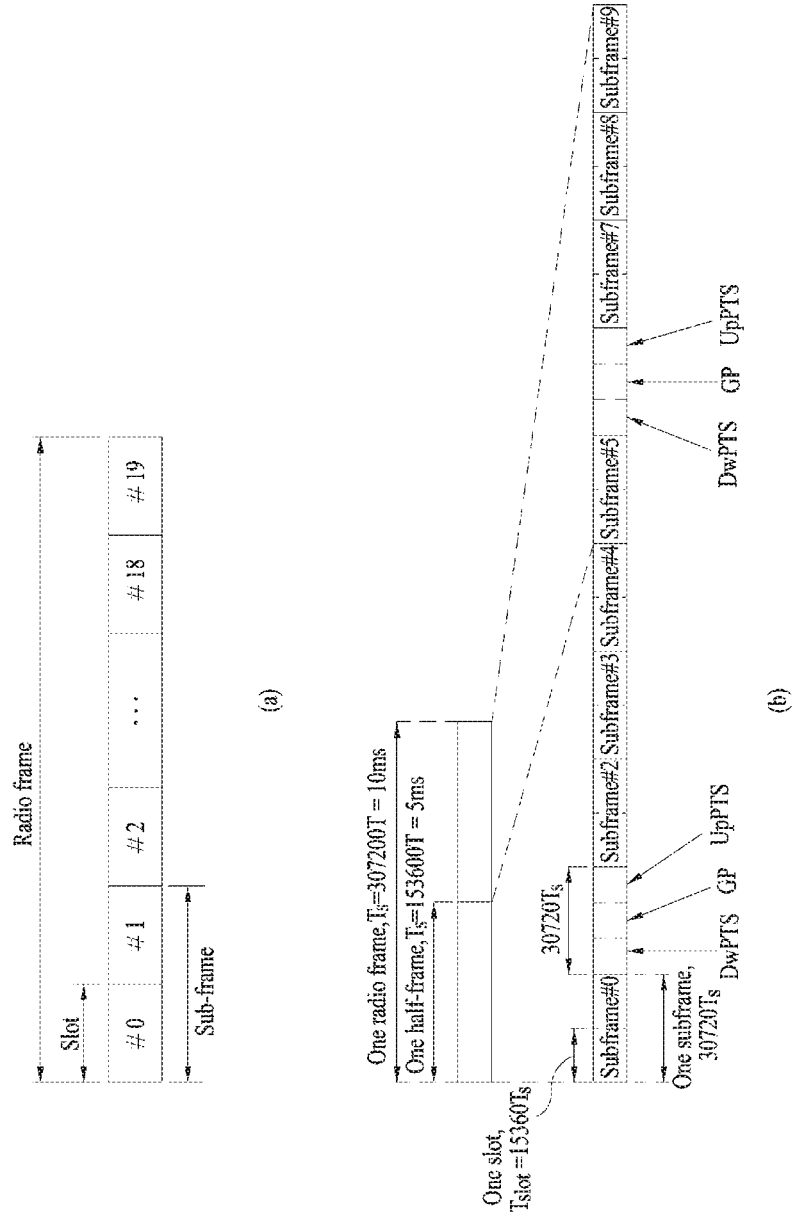
FIG. 3 is a view illustrating exemplary radio frame structures in a 3rd Generation Partnership Project (3GPP) Long Term Evolution (LTE)/LTE-Advanced (LTE-A) system as an exemplary wireless communication system.

FIG. 3 is a view illustrating exemplary radio frame structures in a 3GPP LTE/LTE-A system as an exemplary wireless communication system.

In general, regarding wireless transmission between a BS and a UE which are wireless devices, transmission from the BS to the UE is generically called DL transmission, and transmission from the UE to the BS is generically called UL transmission. A scheme of distinguishing radio resources between DL transmission and UL transmission is defined as duplex. If a frequency band is divided into a DL transmission band and a UL transmission band, and bidirectional transmission and reception are performed in the DL and UL transmission bands, this is referred to as Frequency Division Duplex (FDD). On the other hand, if time-domain radio resources in the same frequency band are divided into a DL period and a UL period and transmission and reception are performed in the DL and UL periods, this is referred to as Time Division Duplex (TDD).

In a cellular OFDM wireless packet communication system, UL/DL data packets are transmitted in subframes, and one subframe is defined as a predetermined time period including a plurality of OFDM symbols. The 3GPP LTE standards support a type-1 radio frame structure applicable to FDD and a type-2 radio frame structure applicable to TDD.

FIG. 3(a) illustrates the structure of the type 1 radio frame. A DL radio frame includes 10 subframes, each subframe including two slots in the time domain. A time taken to transmit one subframe is defined as a Transmission Time Interval (TTI). For example, one subframe may be 1 ms long, and one slot may be 0.5 ms long. One slot includes a plurality of OFDM symbols in time by a plurality of Resource Blocks (RBs) in frequency. Since the 3GPP LTE system adopts OFDMA for DL, an OFDM symbol is one symbol period. An OFDM symbol may also be referred to as an SC-FDMA symbol or symbol period. An RB being a resource allocation unit may include a plurality of contiguous subcarriers in one slot.

The number of OFDM symbols in one slot may be different according to a Cyclic Prefix (CP) configuration. There are two types of CPs, normal CP and extended CP. For example, if an OFDM symbol is configured to include a normal CP, one slot may include seven OFDM symbols. On the other hand, if an OFDM symbol is configured to include an extended CP, the length of one OFDM symbol is increased and thus one slot includes fewer OFDM symbols than in the case of the normal CP. In the case of the extended CP, for example, one slot may include six OFDM symbols. If a channel state is unstable as is the case with a fast moving UE, the extended CP may be used to further reduce inter-symbol interference.

In the case of the normal CP, one slot includes seven OFDM symbols, and thus one subframe includes 14 OFDM symbols. Up to three first OFDM symbols of each subframe may be allocated to a Physical Downlink Control Channel (PDCCH), and the other OFDM symbols of the subframe may be allocated to a Physical Downlink Shared Channel (PDSCH).

FIG. 3(b) illustrates the structure of the type 2 radio frame.

A type 2 radio frame includes two half frames, each half frame including five subframes, a Downlink Pilot Time Slot (DwPTS), a Guard Period (GP), and an Uplink Pilot Time Slot (UpPTS). A subframe includes two slots. The DwPTS is used for initial cell search, synchronization, or channel estimation at a UE. The UpPTS is used for an eNB to perform channel estimation and acquire UL synchronization with a UE. The GP is used to cancel UL interference between a UL and a DL, caused by the multi-path delay of a DL signal.

Each half frame includes five subframes, D represents a DL subframe, U represents a UL subframe, and S represents a special subframe including a DwPTS, a GP, and a UpPTS. The DwPTS is used for initial cell search, synchronization, or channel estimation at a UE. The UpPTS is used for an eNB to perform channel estimation and acquire UL synchronization with a UE. The GP is used to cancel UL interference between a UL and a DL, caused by the multi-path delay of a DL signal.

In the case of a 5-ms DL-UL switch point periodicity, a special subframe S exists in every half frame. A special subframe S exists only in the first half frame. Subframe 0 and subframe 5, and DwPTSs are used for DL transmission only. A UpPTS and a subframe shortly following a special subframe are used for UL transmission only. If multiple cells are aggregated, a UE may assume the same UL-DL configuration across all cells, and the GP of a special subframe may overlap over at least 1456 Ts between different cells. The radio frame structures are purely exemplary, and thus the number of subframes in a radio frame, the number of slots in a subframe, and the number of symbols in a slot may be changed in various manners.

Figure 4:
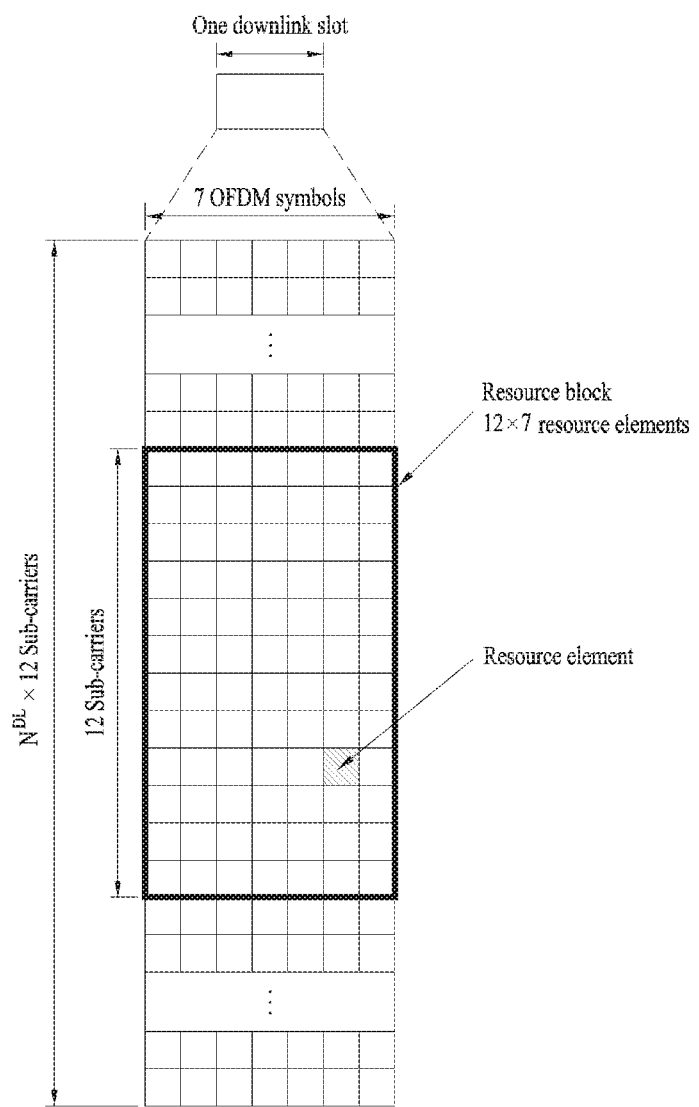
FIG. 4 is a view illustrating an exemplary resource grid for the duration of one Downlink (DL) slot in the 3GPP LTE/LTE-A system as an exemplary wireless communication system.

FIG. 4 illustrates a resource grid for the duration of one DL slot in the 3GPP LTE/LTE-A system as an exemplary wireless communication system.

Referring to FIG. 4, a DL slot includes a plurality of OFDM symbols in the time domain. One DL slot includes 7 (or 6) OFDM symbols in the time domain by a plurality of Resource Blocks (RBs) in the frequency domain Each RB includes 12 subcarriers. Each element of a resource grid is called a Resource Element (RE). One RB includes 12×7(6) REs. The number of RBs in a DL slot, NRB depends on a DL transmission band. The structure of a UL slot is identical to that of a DL slot, except that 01-DM symbols are replaced with SC-FDMA symbols.

Figure 5:
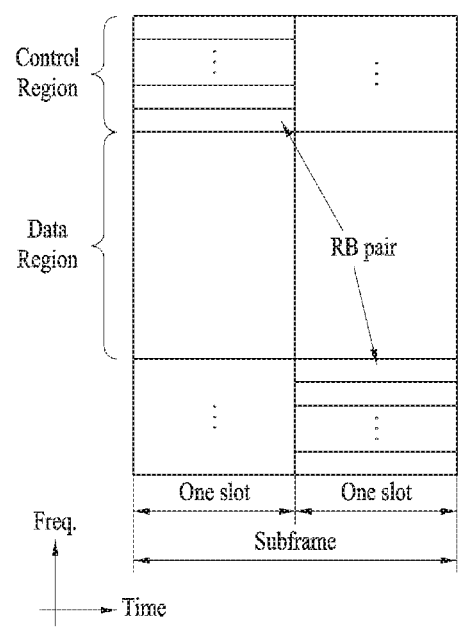
FIG. 5 is a view illustrating an exemplary Uplink (UL) subframe structure in the 3GPP LTE/LTE-A system as an exemplary wireless communication system.

FIG. 5 is a view illustrating an exemplary UL subframe structure in the 3GPP LTE/LTE-A system as an exemplary wireless communication system.

Referring to FIG. 5, up to three (or four) OFDM symbols at the start of the first slot of a subframe corresponds to a control region to which a control channel is allocated. The other OFDM symbols of the subframe correspond to a data region to which a PDSCH is allocated. DL control channels used in 3GPP LTE include a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted in the first OFDM symbol of a subframe, carrying information about the number of OFDM symbols used for transmission of control channels in the subframe. The PHICH carries a HARQ ACK/NACK signal in response to a UL transmission.

Control information carried on the PDCCH is called Downlink Control Information (DCI). DCI format 0 is defined for UL scheduling, and DCI formats 1, 1A, 1B, 1C, 1D, 2, 2A, 3, and 3A are defined for DL scheduling. Depending on its usage, a DCI format selectively includes information such as a hopping flag, an RB assignment, a Modulation Coding Scheme (MCS), a Redundancy Version (RV), a New Data Indicator (NDI), a Transmit Power Control (TPC), a cyclic shift, a DeModulation Reference Signal (DM RS), a Channel Quality Information (CQI) request, an HARQ process number, a Transmitted Precoding Matrix Indicator (TPMI), Precoding Matrix Indicator (PMI) confirmation, and so on.

The PDCCH delivers a transport format and resource allocation information for a Downlink Shared Channel (DL-SCH), a transport format and resource allocation information for an Uplink Shared Channel (UL-SCH), paging information of a Paging Channel (PCH), system information on the DL-SCH, information about resource allocation for a higher-layer control message such as a random access response transmitted on the PDSCH, a set of Tx power control commands for individual UEs of a UE group, a TPC command, Voice Over Internet Protocol (VoIP) activation indication information, and so on. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel A CCE includes a plurality of REGs. The format of a PDCCH and the number of bits in the PDCCH are determined according to the number of CCEs. An eNB determines a PDCCH format according to control information to be transmitted to a UE and adds a Cyclic Redundancy Check (CRC) to the control information. The CRC is masked by an Identifier (ID) (e.g., a Radio Network Temporary Identifier (RNTI)) according to the owner or usage of a PDCCH. If the PDCCH is directed to a specific UE, its CRC may be masked with a Cell-RNTI (C-RNTI) of the UE. If the PDCCH is for a paging message, the CRC of the PDCCH may be masked with a Paging Radio Network Temporary Identifier (P-RNTI). If the PDCCH delivers system information (more specifically, a System Information Block (SIB)), the CRC may be masked with a System Information RNTI (SI-RNTI). If the PDCCH is for a random access response, the CRC may be masked with a Random Access-RNTI (RA-RNTI).

Figure 6:
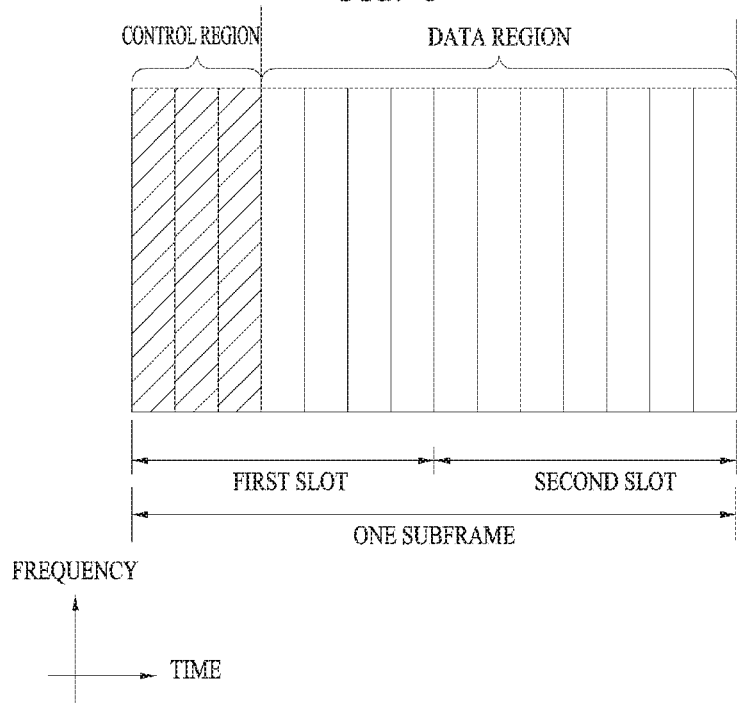
FIG. 6 is a view illustrating an exemplary Downlink (DL) subframe structure in the 3GPP LTE/LTE-A system as an exemplary wireless communication system.

FIG. 6 is a view illustrating an exemplary DL subframe structure in the 3GPP LTE/LTE-A system as an exemplary wireless communication system.

Referring to FIG. 6, a UL subframe includes a plurality of (two) slots. A slot may include a different number of SC-FDMA symbols according to a CP length. The UL subframe may be divided into a control region and a data region in the frequency domain. A Physical Uplink Shared Channel (PUSCH) carrying user data such as voice is allocated to the data region. A Physical Uplink Control Channel (PUCCH) carrying Uplink Control Information (UCI) is allocated to the control region. The PUCCH includes an RB pair located at both ends of the data region along the frequency axis and hops over a slot boundary.

The PUCCH may carry the following control information.
Scheduling Request (SR): information used to request UL-SCH resources. The SR is transmitted in On-Off Keying (OOK).
HARQ ACK/NACK: a response signal to a DL data packet on a PDSCH. The HARQ ACK/NACK indicates whether the DL data packet has been received successfully. A 1-bit ACK/NACK is transmitted as a response to a single DL CodeWord (CW) and a 2-bit ACK/NACK is transmitted as a response to two DL CWs.
Channel Quality Indicator (CQI): feedback information for a DL channel. MIMOrelated feedback information includes an RI, a PMI, a PTI, and so on. The CQI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SCFDMA symbol of a subframe configured to carry an SRS is additionally excluded from the SC-FDMA symbols available for transmission of the UCI. An RS is used for coherent detection of a PUCCH. A PUCCH supports 7 formats according to information carried on the PUCCH.

An FDR system in which UL and DL signals can be transmitted and received simultaneously in the same frequency band has attracted much interest as one of the core technologies of a future 5th Generation (5G) mobile communication system, because it doubles spectral efficiency at maximum, compared to a legacy system in which UL and DL signals are transmitted and received in frequency division or time division.

FDR may be defined as a transmission resource configuration scheme of simultaneously performing transmission and reception in a single transmission frequency band, from the viewpoint of a wireless device. A special example of FDR may be a transmission resource configuration scheme in which a general BS (relay, relay node, or Remote Radio Head (RRH)) simultaneously performs DL transmission and UL reception and a UE simultaneously performs DL reception and UL transmission, in a single frequency transmission band during communication between the BS and the UE. In another example, FDR may be a transmission resource configuration scheme in which transmission and reception take place in the same transmission frequency band between UEs during Device to Device (D2D) communication between the UEs. While the following description is given of proposed FUR-related techniques in the context of wireless transmission and reception between a general BS and a UE, it also covers wireless communication between a wireless network other than a general BS and a UE, and D2D communication between UEs.

Figure 7:
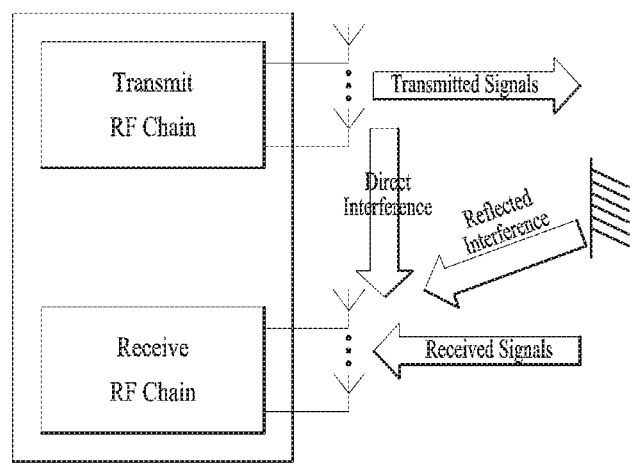
FIG. 7 is a conceptual view of transmission and reception links and Self-Interference (SI) in a Full Duplex Radio (FDR) communication situation.

FIG. 7 is a conceptual view of Transmission (Tx) and Reception (Rx) links and Self Interference (SI) in an FDM communication situation.

Referring to FIG. 7, there are two types of SI, direct interference caused by a signal transmitted through a Tx antenna of a BS or UE and then received at an Rx antenna of the BS or UE, and reflected interference caused by a signal reflected from adjacent topography. Due to a physical distance difference, the magnitude of SI is extremely large, compared to a desired signal. That's why it is necessary to effectively cancel SI, for implementation of an FDR system.

To effectively operate the FDR system, Self-IC (Interference Cancellation) requirements with respect to the maximum transmission power of devices (in the case where FDR is applied to a mobile communication system (BW=20 MHz)) may be determined as illustrated in [Table 1] below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
| --- | --- | --- | --- | --- | --- |
| Macro eNB | 46 dBm | −101 dBm | 5 dB (for eNB) | −96 dBm | 142 dB |
| Pico eNB | 30 dBm | | | | 126 dB |
| Femo eNB,WLAN AP | 23 dBm | | | | 119 dB |
| UE | 23 dBm | | 9 dB(for UE) | −92 dBm | 115 dB |

Referring to [Table 1], it may be noted that to effectively operate the FDR system in a 20-MHz BW, a UE needs 119-dBm Self-IC performance A thermal noise value may be changed to $N_{0,BW}$=−174 dBm+10×log$_{10}$(BW) according to the BW of a mobile communication system. In [Table 1], the thermal noise value is calculated on the assumption of a 20-MHz BW. In relation to [Table 1], for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes.

Figure 8:
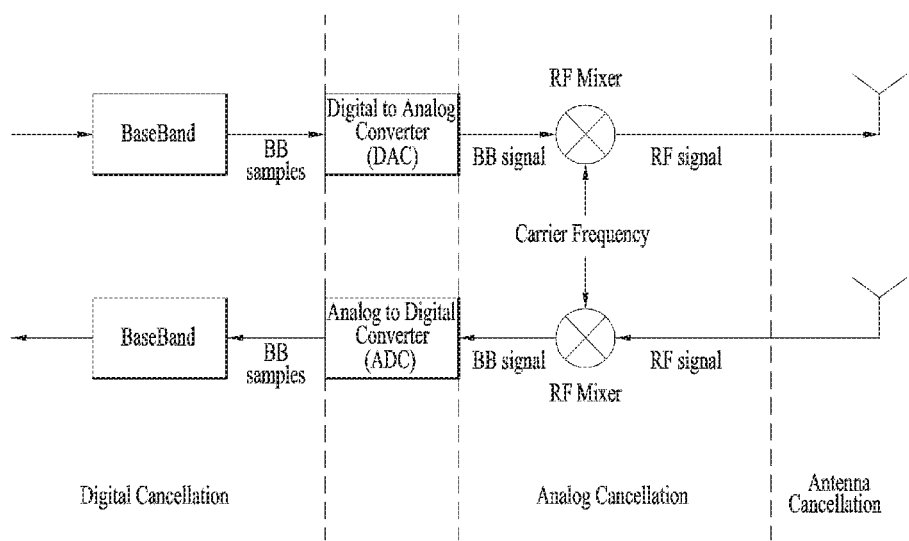
FIG. 8 is a view illustrating positions at which three interference cancellation schemes are applied, in a Radio Frequency (RF) transmission and reception end (or an RF front end) of a device.

FIG. 8 is a view illustrating positions at which three Self-IC schemes are applied, in a Radio Frequency (RF) Tx and Rx end (or an RF front end) of a device. Now, a brief description will be given of the three Self-IC schemes.

Antenna Self-IC:

Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC:

Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC:

Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 9:
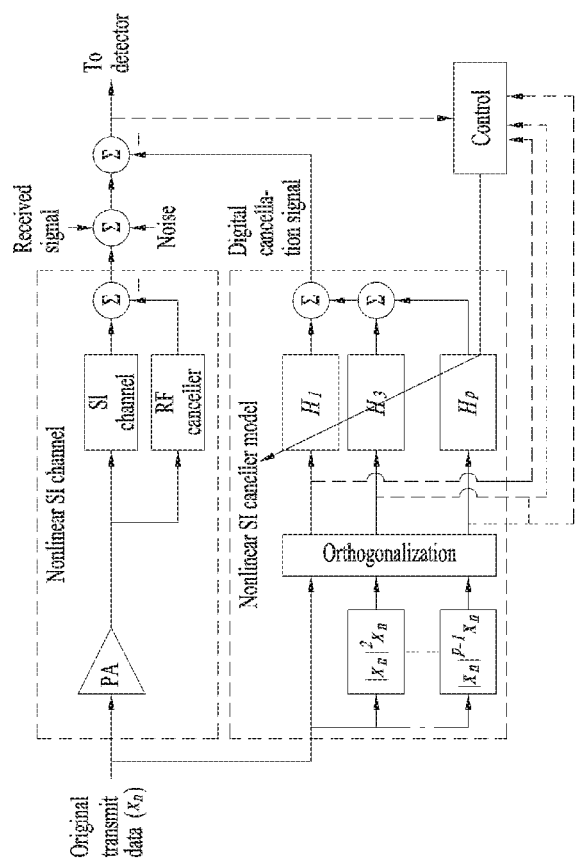
FIG. 9 represents adaptive nonlinear digital cancellation for final SI suppression.

FIG. 9 represents adaptive nonlinear digital cancellation for final SI suppression.

After Analog Self-IC, the power level of the residual SI can still be relatively strong in the digitized signal. This calls for additional Digital Self-IC, which will then decrease the level of the SI signal below the receiver noise floor. The most straightforward method of cancelling SI in the digital domain is to use the original transmit data as the reference signal, which is then modified according to the effective channel experienced by the residual SI signal and subsequently subtracted from the overall received signal.

The channel includes the effects of the transmitter and the receiver, the circulator, and the RF canceller, as well as the multipath components reflected from the antenna and the surrounding environment. Modeling, estimating, and tracking this effective SI channel is the key factor in digital SI cancellation, and will determine the achievable cancellation in the digital domain.

Typically, in most works reported in the literature, the effective SI channel is assumed to be a linear multipath channel, which essentially means that the transmitter and receiver chains are assumed to be linear. With high-quality components (e.g., well-calibrated laboratory equipment), this can indeed be the case.

However, when considering a mobile-scale full-duplex transceiver utilizing low-cost mass-produced components, assuming the transmitter and receiver chains to be linear will result in a significant model mismatch. In particular, the transmitter PA is typically heavily nonlinear, especially with the higher transmit powers. This has a significant impact on the residual SI observed at digital baseband.

Stemming from the above, the nonlinearity of the components must be considered in the digital cancellation processing, especially the nonlinear distortion produced by the transmitter PA. In principle, this can be done by modelling the residual SI as a weighted sum of nonlinear transformations of the original transmit data, each of which also has some delayed components (memory) present.

A principal structure of such a nonlinear digital canceller is shown in FIG. 9, where the original transmit data is first transformed with nonlinear basis functions and then orthogonalized to ensure efficient learning, as discussed in more detail below.

In this nonlinear canceller, the actual transceiver chain is modelled as a cascade of a nonlinear PA and a linear filter, the latter of which consists of the PA memory, multipath components of the SI signal reflected from the surroundings, and the RF cancellation circuit. This means that the nonlinear residual SI channel follows a parallel Hammerstein (PH)

model, with parameters that are relatively straightforward to estimate and track based on the observed SI signal.

In general, the parameter estimation can be carried out, for instance, with block least squares or LMS, depending on the application and available computational resources. In a practical mobile transceiver, adaptivity is a very important factor, as already discussed, and thus LMS or some other adaptive algorithm is preferred to ensure high performance under varying coupling channel conditions. In FIG. 9, the adaptivity is depicted by the real-time control block, which tunes the coefficients based on the canceller output signal. The digital canceller output signal is also used for the actual receiver digital baseband processing, including the detection of the actual received signal of interest.

Overall, the performance of this type of nonlinear digital canceller is of course highly dependent on the validity of the underlying model. That is, the utilized PH model has been shown to be quite accurate for modeling a wide variety of PAs, but often there are also other sources of impairments that are obviously not included in the model, such as phase noise.

However, under typical circumstances, the nonlinearity of the PA is the most significant analog impairment from the SI cancellation perspective, which means that the PH model can be expected to provide sufficient SI cancellation performance. Therefore, combining an adaptive nonlinear digital canceller with the proposed multi-tap adaptive RF canceller will result in an agile mobile full-duplex transceiver design that is capable of efficient SI cancellation in both the analog and digital domains.

Figure 10:
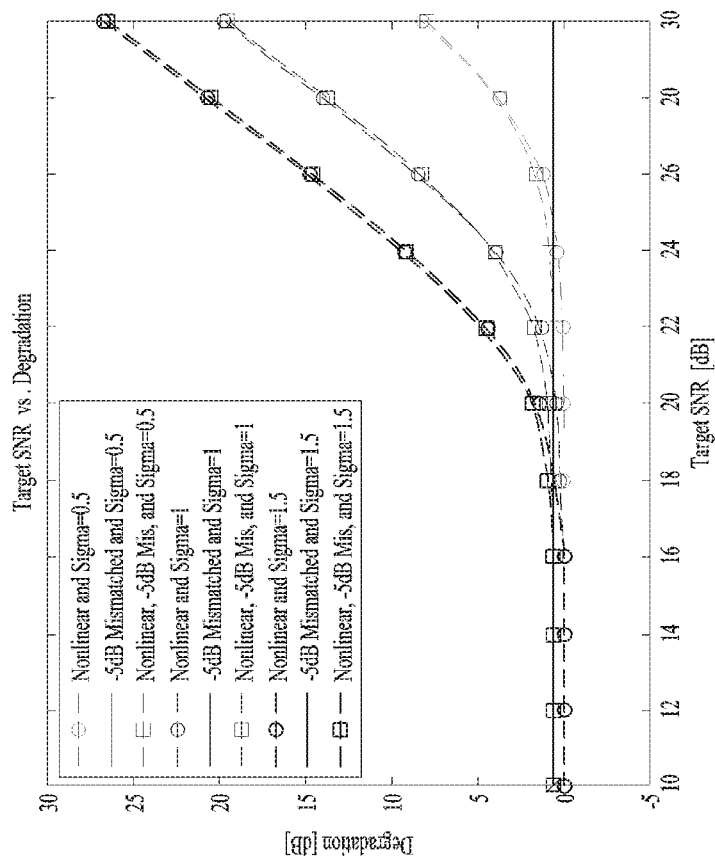
FIG. 10 represents simulations for SINR degradation due to HPA (High Power Amplifier) nonlinearity and channel mismatch.

FIG. 10 represents simulations for SINR degradation due to HPA (High Power Amplifier) nonlinearity and channel mismatch.

As identified in the introduction, the goal of this paper is to determine the severity of the omission of power amplifier nonlinearity considerations in judging the robustness of per subcarrier transmit beamformed systems to partial or incorrect channel state feedback. After analytically modeling and determining the effect of the nonlinearity in previous sections, the goal here is to provide some numerical experiments with realistic parameters showing the receiver subcarrier SINR degradation due to the transmit HPA nonlinearity.

Simulation Parameters

In the subsequent sections we detail the parameters utilized in our simulations. Many have been drawn from standards documents in order to maximize the relevance of the simulation results.

HPA Model Parameters:

We derive the HPA nonlinearity model parameters by considering a specific HPA model, the Sharp IRM047U6. From the datasheet for this device, we can determine the following table 2.

TABLE 2

| Name | Value | Remark |
|---|---|---|
| Model | Sharp IRM046U7 | Dual Band HRA |
| f | 2.45/5 [GHz] | Frequency |
| $P_s$ | 28/27 [dBm] | Saturated Power |
| $G_L$ | 30/25 [dB] | Approx. Linear Gain |
| R | 50 [Ω] | Resistance |

This gives nonlinearity model parameters for the low band at f=2.45 [GHz] of $a_1 \approx 32.6228$, $a_3 \approx 98.9999$, and for the high band at f=5 [GHz] $a_1 \approx 17.7828$, $a_3 \approx 22.1633$.

OFDM System Parameters:

The parameters for the OFDM modulation have been selected to mimic the IEEE 802.11 standards, and are below table 3.

TABLE 3

| Parameter | Value | Remark |
|---|---|---|
| Mod | 16 QAM | Constellation |
| $f_c$ | 2.45 [GHz] | Center Freq. |
| B | 20 [MHz] | Total Bandwidth |
| N | 64 | Number of Subcarrier |
| $N_u$ | 12 | Number of Null Subcarrier |
| $\Delta_f$ | 312.5 [KHz] | Carrier Spacing |
| $T_{FFT}$ | 3.2 [μs] | FFT Time Period |
| $T_{GI}$ | 0.8 [μs] | Guard Interval |
| $T_{SYM}$ | 4.0 [μs] | Symbol Duration |
| $T_s$ | 50 [ns] | Req. min. Sampling Time |
| M | 4 | Over-Sampling Factor |
| β | $1/a_1$ | scale factor |
| $M_T$ | 4 | Number of Tx. Ant. |
| $M_R$ | 1 | Number of Rx. Ant. |
| γ | 10-30 [dB] | Receiver Target SNR |

Channel Parameters:

Finally, we select the parameters for the statistical multipath channel model according to the ITU Indoor Office Channel B model in below table 4.

TABLE 4

| Tap | Rel. Delay [ns] | Rel. Power [dB] | Doppler |
|---|---|---|---|
| 1 | 0 | 0 | Flat |
| 2 | 100 | −3.6 | Flat |
| 3 | 200 | −7.2 | Flat |
| 4 | 300 | −10.8 | Flat |
| 5 | 500 | −18.0 | Flat |
| 6 | 700 | −25.2 | Flat |

Simulation Results & Conclusions

In order to gain a quantitative understanding of the significance of a HPA nonlinearity in OFDM systems employing per subcarrier transmitter beamforming, we simulated an OFDM system and multipath channel with parameters as specified in Section IV-A. Statistics were gathered over 1000 Monte Carlo trials for a series of target receiver SNRs γ and noise powers $\sigma^2$. Of particular interest was the average (across subcarriers and Monte Carlo iterations) difference between the target receiver SNR and the actual SINR when 1) there was a mismatch between the true multipath channel and the one used to build the beamformer according to 4, and 2) when in addition to the mismatch, HPA nonlinearities were accounted for in the analysis. Experiments for multiple levels of receiver additive white Gaussian noise $\sigma_k^2$ were conducted. FIG. 10 depicts the results. From the plot it can be deduced that the transmit HPA nonlinearity can cause significant receiver SINR degradation (far more degradation than is predicted by including channel mismatch alone), especially under high target SNRs. The ultimate conclusion from this analysis is that HPA nonlinearity considerations should be considered when determining the level of accuracy necessary for channel estimate feedback in OFDM systems employing per subcarrier beamforming.

As described above, an adaptive digital cancellation technique for canceling self-interference (SI) in a transceiver may be applied to implement FUR. However, when SI is canceled from a received signal in the adaptive digital cancellation technique, adaptive signal processing based on least mean square (LMS) feedback is applied to estimate a higher order term which is a nonlinear component of the PA (Power Amplifier). At this time, since a plurality of carriers should be considered in a multicarrier system, complexity of inter-modulation distortion (IMD) analysis at a subcarrier level may be increased, whereby the analysis may be difficult. Therefore, when the multicarrier system is applied, it is required to use an adaptive signal processing scheme of a time domain in an FDR status.

That is, in the multicarrier system, analysis in the frequency domain may be unavailable. However, even though the adaptive signal processing scheme is used in the time domain, a processing time for adaptive signal processing may be required for adaptive nonlinearity digital SI cancellation, and implementation complexity may be increased.

Therefore, if the multicarrier system is applied, application of a deterministic PA nonlinearity model, in which IMD analysis at a carrier level may be performed, may be required in the frequency domain.

That is, when the multicarrier system (e.g., OFDMA) is applied in FDR, SI cancellation in the frequency domain, which is based on the deterministic PA nonlinearity model in the frequency domain, may be required. For example, a canceller for performing SI cancellation in the frequency domain, which is based on the deterministic PA nonlinearity model, may be referred to as an advanced digital self-interference canceller. However, the canceller is not limited to the aforementioned title. The canceller may be referred to as a different title for the method for canceling self-interference equally applied thereto, and is not limited to the aforementioned example.

At this time, the advanced digital self-interference canceller may be operated to cancel IMD component per subcarrier by predicting exact ID component for each subcarrier in the frequency domain on the basis of the third order polynomial model of the PA. For example, an input and output based on a polynomial in HPA may be expressed by the following Equation 1.

$$y(t) = HPA[x(t)] \approx \sum_{n=1}^{\infty} a_n x^n(t) \qquad \text{[Equation 1]}$$

At this time, $x(t)$ is an actual input component of the PA, and $y(t)$ may be an output value from the PA. When the Equation 1 is expressed as a polynomial, even numbered terms may easily be canceled by application of LPF (Low Pass Filter). Therefore, odd numbered terms may only remain to correspond to the Equation 1, and first to third order terms may be considered as dominant components which substantially affect the polynomial. In this case, the following Equation 2 may be expressed.

$$(l) \approx a_1 x(l) + a_3 x^3(l) \qquad \text{[Equation 2]}$$

At this time, the coefficients $a_1$ and $a_3$ may be calculated as expressed by the following Equation 3 by using linear gain $G_L$ [dB] from a datasheet of a given PA, saturated power $P_{sat}$ [dBm], and source and load resistance $R[\Omega]$.

$$a_1 = \text{function}(G_L) = 10^{\frac{G_L}{20}} \qquad \text{[Equation 3]}$$

$$a_3 = \text{function}(G_L, R, P_{sat}) = 10^{1.9946 - \log R + \frac{3G_L}{20} - \frac{P_{sat}}{10}}$$

At this time, if an OFDM signal instead of a single-tone is considered, N OFDM symbols modulated by QAM may be $X_0, X_1, \ldots X_{N-1}$. When symbol $X_k$ at the kth subcarrier based on N-IFFT is based on subcarrier beamforming that considers beamforming coefficient $p_k$, the symbol $X_k$ may be expressed as the following Equation 4. Also, the same baseband signal may be expressed as the following Equation 5, and may be expressed differently as the following Equation 6.

$$x(t) = \frac{1}{\sqrt{N}} \text{Re}\left[ e^{j2\pi f_c t} \sum_{k=-\frac{N}{2}}^{\frac{N}{2}-1} p_{k+\frac{N}{2}} X_{k+\frac{N}{2}} e^{j2\pi k \Delta f t} \right] \qquad \text{[Equation 4]}$$

$$x_B(t) = \frac{1}{\sqrt{N}} \sum_{k=-\frac{N}{2}}^{\frac{N}{2}-1} p_{k+\frac{N}{2}} X_{k+\frac{N}{2}} e^{j2\pi k \Delta f t} \qquad \text{[Equation 5]}$$

$$x(t) = \frac{1}{\sqrt{N}} \text{Re}\left\{ e^{j2\pi f_c t} \sum_{a=1}^{N} p_a X_a e^{j2\pi f_c t} \right\} = \text{Re}[e^{j2\pi f_c t} x_B(t)] \qquad \text{[Equation 6]}$$

At this time, if a third order term which is a nonlinearity component is considered in the PA, the aforementioned input value may be expressed as the following Equation 7.

$$x^3(t) = \left[ \frac{1}{2}(e^{j2\pi f_c t} x_B(t) + e^{-j2\pi f_c t} x_B^*(t)) \right]^3 = \qquad \text{[Equation 7]}$$

$$\frac{1}{3}[e^{j6\pi f_c t} x_B^3(t) + e^{-j6\pi f_c t} x_B^{*3}(t) +$$

$$3 e^{j2\pi f_c t} x_B^2(t) x_B^*(t) + 3 e^{-j2\pi f_c t} x_B(t) x_B^{*2}(t)] =$$

$$\text{Re}\left[ \frac{1}{4} e^{j6\pi f_c t} x_B^3(t) \right] + \text{Re}\left[ \frac{3}{4} e^{j2\pi f_c t} x_B^2(t) x_B^*(t) \right]$$

If LPF is applied to the aforementioned configuration, the first term may be cancelled, and components for the third order term remain, whereby the baseband signal may be expressed as the following Equation 8.

$$[x^3(t)]_B \cong \frac{3}{4} x_B(t) |x_B(t)|^2 \qquad \text{[Equation 8]}$$

Therefore, components for PA linearity in the baseband may be expressed as the following Equation 9.

$$y(t) = a_1 \beta x_B(t) + a_3 \beta^3 \frac{3}{4} x_B(t) |x_B(t)|^3 \qquad \text{[Equation 9]}$$

In the Equation 9, $\beta$ may be a scaling factor determined when the PA amplifies a signal considering flexibility of signal amplification.

At this time, if nonlinearity effect is considered, influences of the respective subcarriers in the frequency domain may be identified from each other by nonlinear terms based on linear components and third order components. Therefore, a signal related to linear components of a modulated signal of the kth subcarrier reflecting nonlinear effect may be expressed as the following Equation 10.

$$V_k^L = \frac{a_1 \beta}{\sqrt{N}} p_k X_k = c_L p_k X_k \qquad \text{[Equation 10]}$$

At this time, $V_k^L$ is a modulated signal of the kth subcarrier after the PA and is a linear component given by $a_1 \beta x_B(t)$ as a first term. Also, in the third order term, IMD components caused by nonlinearity may be added to the kth subcarrier. At this time, nonlinear inter-carrier interference caused by IMD may be identified by four cases as expressed by the following Equation 11.

$$V_k^N = V_k^{N_1} + V_k^{N_2} + V_k^{N_3} + V_k^{N_4} \qquad \text{[Equation 11]}$$

At this time, case $N_1$ consisted of its subcarrier terms by the third order term may be expressed as the following Equation 12 by (k+k−k).

$$V_k^{N_1} = c_N p_k |p_k|^2 X_k |X_k|^2 \qquad \text{[Equation 12]}$$

Also, in $N_2$ [α+α−(2α−k)], interference based on repeated different frequencies (α) and another frequency (2α−k) may be expressed as the following Equation 13.

$$V_k^{N_2} = C_N \sum_{\alpha=\lceil \frac{k+1}{2} \rceil, \neq k}^{\lfloor \frac{k+N}{2} \rfloor} p_\alpha^2 p_{2\alpha-k}^* X_\alpha^2 X_{2\alpha-k}^* \qquad \text{[Equation 13]}$$

Also, in $N_3$ [k+α−α], interference based on a subcarrier of $N_3$ [k+α−α] and another subcarrier (α, −α) may be expressed as the Equation 14.

$$V_k^{N_3} = 2c_N p_k X_k \sum_{\alpha=1, \neq k}^{N} |p_\alpha|^2 |X_\alpha|^2 \qquad \text{[Equation 14]}$$

Also, in $N_4$[α+β−(α+β−k)], interference based on different subcarriers (α, β, −(α+β−k)) may be expressed as the following Equation 15.

$$V_k^{N_4} = \qquad \text{[Equation 15]}$$
$$c_N \sum_{\alpha=1, \neq k}^{N} \sum_{\beta=\max[-\alpha+k+1,1], \neq \alpha, \neq k}^{\min[N, N-\alpha+k]} p_\alpha p_\beta p_{\alpha+\beta-k}^* X_\alpha X_\beta X_{\alpha+\beta-k}^*$$

At this time, in the Equation 15, $$c_L = \frac{a_s \beta}{\sqrt{N}} \text{ and } c_N = \frac{3 a_s \beta^2}{4 N \sqrt{N}}$$

may be obtained. At this time, the coefficients $a_1$ and $a_3$ may be calculated as expressed by the following Equation 16 using linear gain $G_L$ [dB] from a datasheet of a given PA, saturated power [dBm], and source and load resistance R[Ω], and 13 may be a scaling factor determined by $P_{sat}$ the PA.

$$a_1 = \text{function}(G_L) = 10^{\frac{G_L}{20}} \qquad \text{[Equation 16]}$$
$$a_3 = \text{function}(G_L, R, P_{sat}) = -10^{1.9946 - \log R + \frac{3G_L}{20} - \frac{P_{sat}}{10}}$$

As described above, based on the Equations 11 to 16, a signal modulated based on an influence of subcarriers of different positions as well as a signal modulated by the kth subcarrier after the PA may be overlapped with the kth subcarrier position, whereby inter-carrier interference may occur.

At this time, based on adaptive SI cancellation, SI may be cancelled from the time domain by adaptive estimation based on a linear modulated transmission signal which is transmitted prior to the PA. That is, based on the aforementioned adaptive SI cancellation, SI should be cancelled by estimating an influence of parameters without consideration of parameters (e.g., $a_1$, $a_3$, β) applied from the PA. At this time, there is limitation in considering an influence of parameters applied to the PA and an influence based on channel estimation from $V_N^L + V_k^N$ based on the aforementioned Equation in the frequency domain. Therefore, since exact estimation may not be performed by the parameters of the PA, estimation considering the parameters of the PA may be required.

Therefore, as described above, a method for considering an influence of PA parameters based on deterministic polynomial modeling may be required. In more detail, a parameter value may be set previously as a preset value (or given value) from the datasheet of the PA. At this time, a signal after the PA may be estimated deterministically using the parameter value to enable frequency domain operation in SI cancellation. That is, factors for PA parameters in the frequency domain may be applied as deterministic values, whereby complexity of the frequency domain operation may be reduced and a structure of the SI canceller may be simplified. Hereinafter, a deterministic SI cancellation method based on PA parameter values as given values will be described as each embodiment.

Embodiment 1

Figure 11:
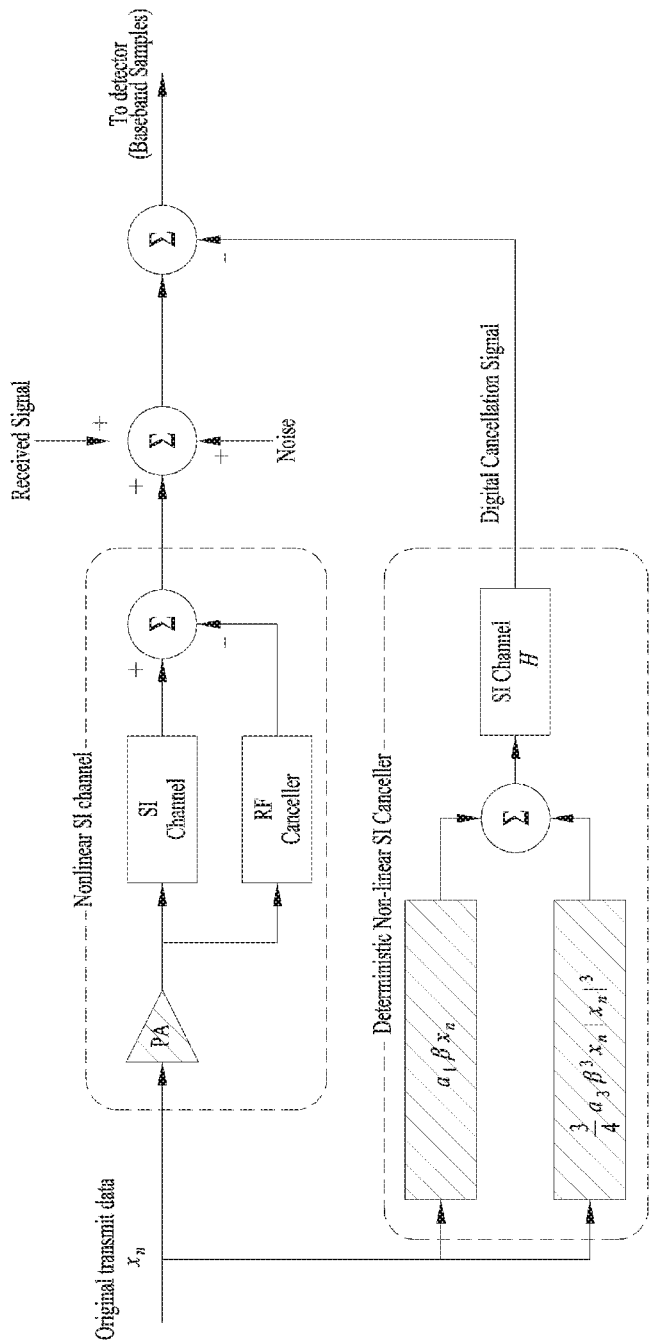
FIG. 11 is a view illustrating a method for canceling SI on the basis of a deterministic non-linear SI canceller.

Referring to FIG. 11, the UE may cancel SI on the basis of a deterministic non-linear SI canceller.

In more detail, referring to the digital SI canceller of FIG. 9, the deterministic nonlinear SI canceller may be more applied to FIG. 11. Specifically, the SI canceller cancelled from the receiver to which the deterministic nonlinear SI canceller is applied may be represented as shown in FIG. 11.

At this time, referring to FIG. 11, output of PA according to deterministic polynomial modeling may be expressed as the following Equation 17. Referring to the Equation 17 and FIG. 11, input values may be given to the deterministic nonlinear SI canceller as baseband samples $x_k$. At this time, a first order term and a third order term may respectively be calculated with reference to parameters (e.g., $a_1$, $a_3$, β) which are values (or preset values) given by the PA, whereby the calculated values may be reflected in SI channel. Afterwards, the SI channel may be reflected in a digital cancellation signal.

$$y(t) = a_1 \beta x_B(t) + a_3 \beta^3 \frac{3}{4} x_B(t) |x_B(t)|^2 \qquad \text{[Equation 17]}$$

At this time, as an example, although dominant terms include first to third order terms only, the dominant terms may be expanded to terms more than the third order term. At this time, as an Equation expanded to the term more than the third order term, the following Equation 18 may be expressed. In this case, additional parameters (e.g., $a_5, a_7, \ldots$) may be obtained from the datasheet of the PA, whereby an output value may be expressed as the following Equation 18.

$$y(t) = \alpha_1 \beta x_B(t) + \alpha_3 \beta^3 \frac{3}{4} x_B(t)|x_B(t)|^2 + \quad \text{[Equation 18]}$$
$$\alpha_5 \beta^5 \frac{5}{8} x_B(t)|x_B(t)|^4 +$$
$$\alpha_7 \beta^7 \frac{35}{64} x_B(t)|x_B(t)|^6 + \ldots$$
$$= \sum_{i=1}^{\infty} \alpha_{2i-1} \beta^{2i-1} \frac{\binom{2i-1}{i-1}}{2^{2i-3}} x_B(t)|x_B(t)|^{2i-2}$$

Figure 12:
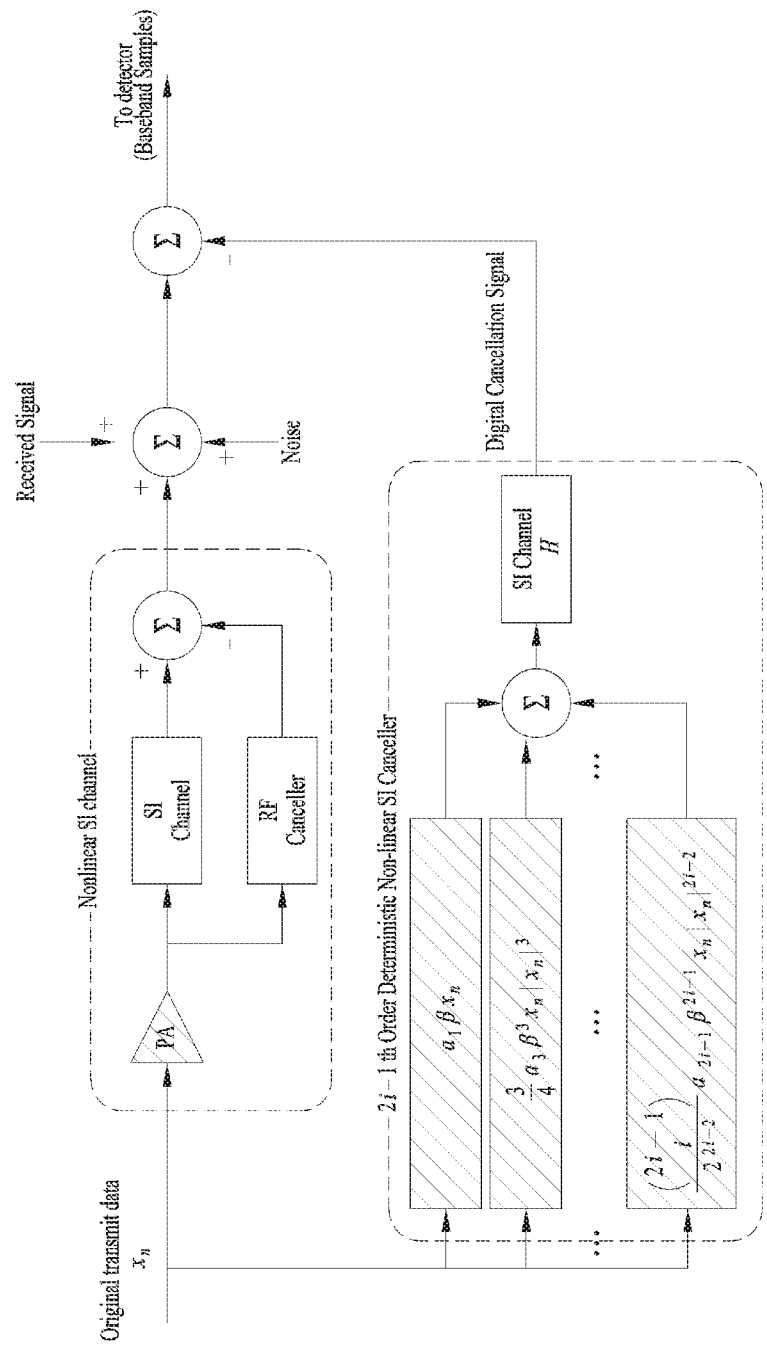
FIG. 12 is a view illustrating another method for canceling SI on the basis of a deterministic non-linear SI canceller.

At this time, based on the Equation 18, the deterministic nonlinear SI canceller may be expressed as shown in FIG. 12.

In more detail, at this time, $$\binom{n}{k} = \frac{n!}{(n-k)!k!}$$

may be obtained. Deterministic nonlinear SI cancellation may be performed by the output value of the PA through all parameter values (e.g., $a_1, a_3, a_5, a_7, \beta$) given by the datasheet. That is, the term expanded as additional parameters in FIG. 11 may be reflected in the SI channel. At this time, the SI channel may be reflected in the digital cancellation signal to generate a final signal.

That is, the output value of the PA may be a parameter value or previously set value based on the datasheet of the PA. At this time, inter-carrier interference based on the parameters of the PA at a frequency domain level may be determined deterministically. That is, as the signal after the PA is determined deterministically, complexity of the frequency domain operation may be reduced, and the structure of the SI canceller may be simplified. The present invention is not limited to the aforementioned embodiment.

Embodiment 2

Figure 13:
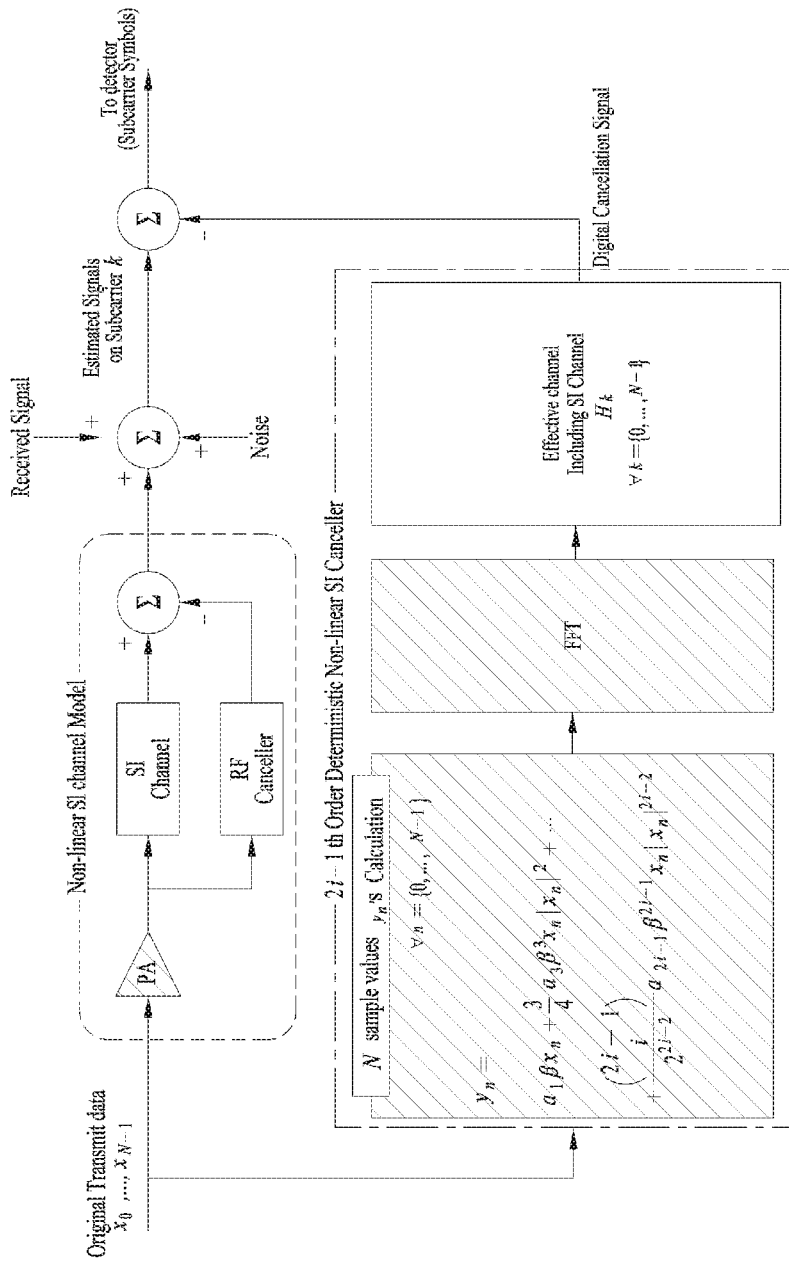
FIG. 13 is a view illustrating a deterministic non-linear SI canceller to which fast fourier transform (FFT) processing is added.

FIG. 13 is a view illustrating a deterministic non-linear SI canceller to which fast fourier transform (FFT) processing is added.

Referring to FIG. 13, FFT processing may be added to FIGS. 11 and 12, whereby SI cancellation in the frequency domain may be performed easily. In more detail, the output of the PA is predicted and calculated from deterministic nonlinear PA modeling, and then nonlinearity effect at each subcarrier position in the frequency domain may be calculated using FFT processing. That is, the operation in the frequency domain including a channel may be performed. As a result, the signal after the PA, which is determined based on parameters, may be analyzed in the frequency domain.

Figure 14:
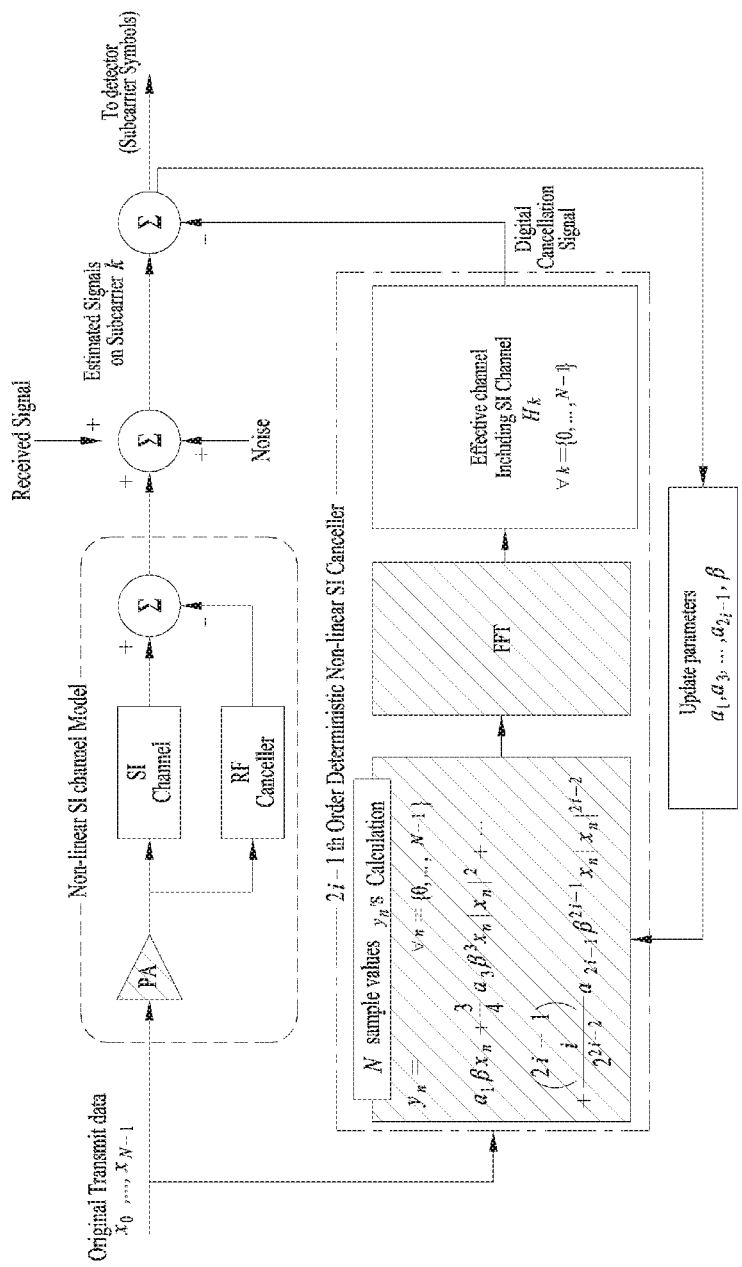
FIG. 14 is a view illustrating a deterministic non-linear SI canceller for which estimation error compensation is performed.

Also, FIG. 14 is a view illustrating a deterministic non-linear SI canceller for which estimation error compensation is performed.

Referring to FIG. 14, a control for compensating for an estimation error of parameters (e.g., $a_1, a_3, a_5, a_7, \beta$) may be added. That is, an estimation error of the parameters provided as values given to improve performance of a PA nonlinear model may be fed back to obtain a more exact signal, whereby performance of the deterministic nonlinear canceller may be improved.

Embodiment 3

Unlike the Embodiment 2, a digital SI canceller which reflects IMD mitigation at a subcarrier level may be configured.

In more detail, as described above, if the multicarrier system is applied in FDR, a digital SI canceller at a subcarrier level may be configured considering the operation of different carriers. At this time, for example, interference that affects each subcarrier with respect to N OFDM symbols $X_0, X_1, \ldots, X_{N-1}$ applied to N-IFFT as described above may be given as expressed by the following Equations 19 and 20. At this time, as an example, the following Equations 19 and 20 may be those considering $p_k=1, \forall k \in \{0, \ldots, N-1\}$ which is not affected by beamforming.

$$V_k^L = \frac{\alpha_1 \beta}{\sqrt{N}} X_k \quad \text{[Equation 19]}$$

$$V_k^N = V_k^{N1} + V_k^{N2} + V_k^{N3} + V_k^{N4} \quad \text{[Equation 20]}$$
$$\Big($$
$$V_k^{N1} = c_N X_k |X_k|^2, \; V_k^{N2} = c_N \sum_{\alpha=\lceil \frac{k+1}{2} \rceil, \neq k}^{\lfloor \frac{k+N}{2} \rfloor} X_\alpha^2 X_{2\alpha-k}^*,$$
$$V_k^{N3} = 2c_n X_k \sum_{\alpha=1, \neq k}^{N} |X_\alpha|^2,$$
$$V_k^{N4} = c_N \sum_{\alpha=1, \neq k}^{N} \sum_{\beta=max[-\alpha+k+1,1], \neq \alpha, \neq k}^{min[N, N-\alpha+k]} X_\alpha X_\beta X_{\alpha+\beta-k}^*$$
$$\Big)$$

Figure 15:
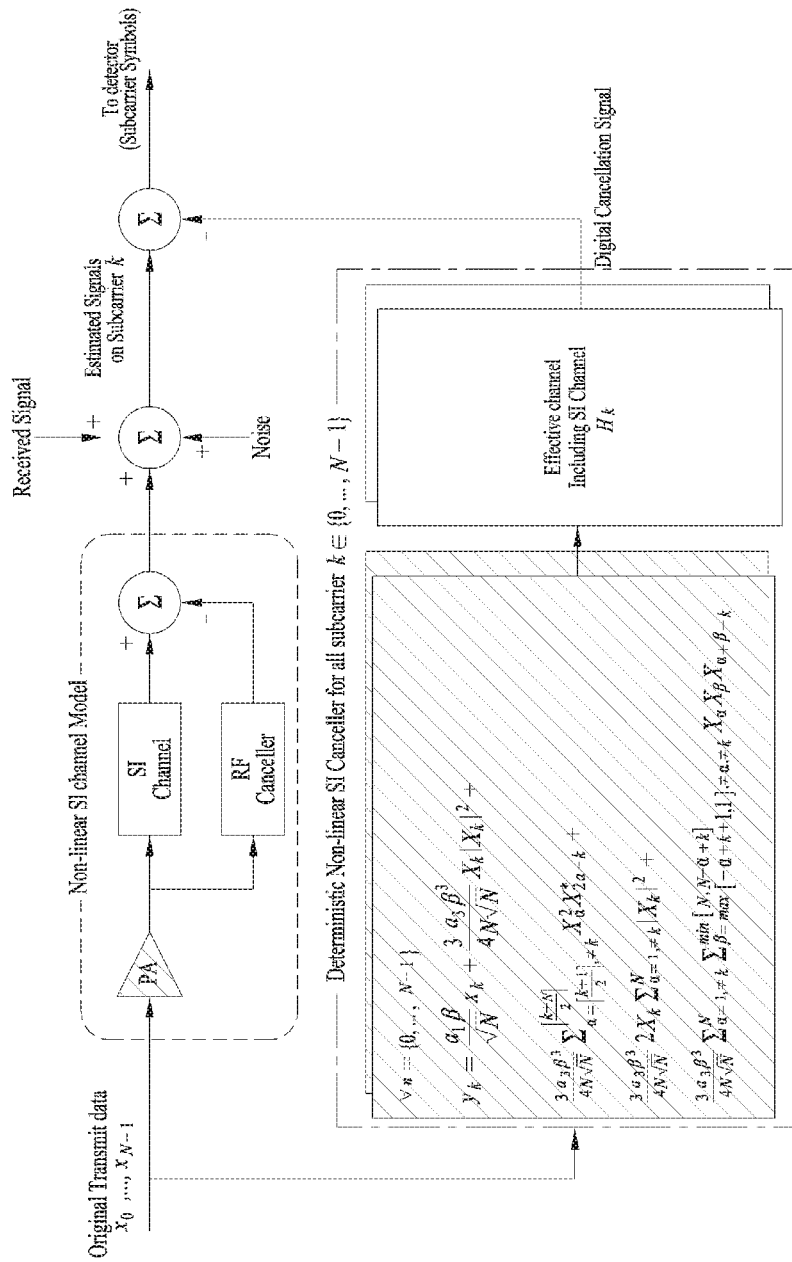
FIG. 15 is a view illustrating a method for configuring a digital SI canceller at a subcarrier level considering an operation of different carriers.

At this time, FIG. 15 is a view illustrating a method for configuring a digital SI canceller at a subcarrier level considering an operation of different carriers.

Referring to FIG. 15, if $X_0, X_1, \ldots, X_{N-1}$ are given as N subcarrier symbols, inter-carrier interference per subcarrier may be calculated by polynomial modeling of the PA. That is, as described above, values of $V_k^L$ and $V_k^N$ may be calculated, whereby the deterministic nonlinear SI canceller may be configured as shown in FIG. 15. Therefore, SI components that reflect nonlinearity of the PA may be cancelled from the frequency domain.

At this time, in the embodiment 2, analysis of the frequency domain is performed through FFT processing within the SI canceller. And, in the embodiment 3, analysis may be performed in the frequency domain with respect to each subcarrier without FFT processing. For example, in the embodiment 2, analysis may be performed in the frequency domain considering nonlinearity influence in the output value of the PA. On the other hand, in the embodiment 3, since inter-carrier interference from each subcarrier of PA input to a given subcarrier of PA output may be identified, effective analysis may be performed.

Figure 16:
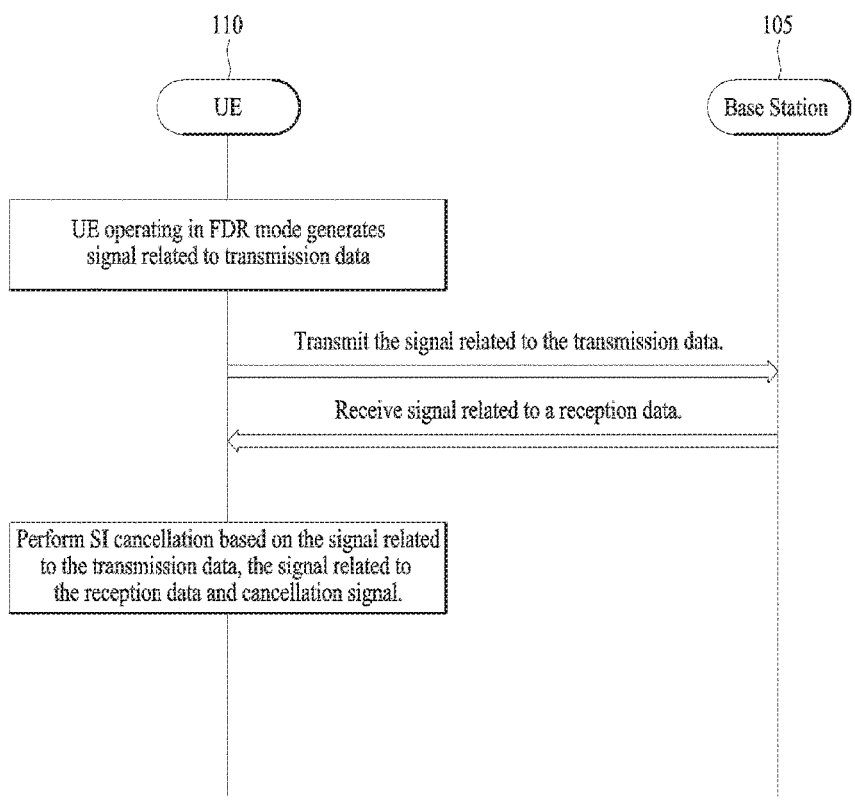
FIG. 16 is a view illustrating a method for performing SI cancellation.

FIG. 16 is a view illustrating a method for performing SI cancellation.

A UE 110 operating in FDR mode may generate a signal related to transmission data. At this time, the FDR mode may be an FDR status as described above. That is, a case that the UE 110 performs transmission and reception using the same time and frequency resource may correspond to the FDR mode. At this time, the UE may generate a signal related to data to be transmitted. The UE may transmit data to a BS 105. Also, as an example, the UE may transmit data to another UE or another device. That is, although the device to which data is transmitted is shown as the BS 105 in FIG. 16, the device is not limited to the BS.

The UE may receive a signal related to reception data from the BS 105. At this time, as described above, since the FDR mode (or FDR status) is operated, the UE may transmit and receive data in the same time and frequency resource.

At this time, the UE may perform SI cancellation on the basis of the transmitted signal and the received signal. Also, the UE may further perform SI cancellation on the basis of a cancellation signal. At this time, for example, the cancellation signal may be a value generated from the signal related to transmission data on the basis of the previously set value of the PA as described above. In more detail, the signal after the PA may be estimated deterministically using the value given from the datasheet of the PA as described above. This value may be the cancellation signal. That is, the cancellation signal that has canceled nonlinearity with reference to the parameters given by the PA may be used for SI cancellation as described above.

FIG. 17 is a flow chart illustrating a method for performing SI cancellation.

The UE operating in FDR mode may generate a signal related to transmission data (S1710). Then, the UE may transmit the generated signal related to transmission data (S1720). Next, the UE may receive a signal (S1730). At this time, as described in FIGS. 1 to 16, since the UE operating in FDR mode may perform transmission and reception in the same time and frequency resource, SI cancellation may be required.

Next, the UE may generate a cancellation signal from the transmission data generated based on the previously set value of the PA (S1740). At this time, as described in FIGS. 1 to 16, the signal after the PA may be estimated deterministically using the value given from the datasheet of the PA, and this value may be the cancellation signal. The signal that has canceled nonlinearity with reference to the parameters given by the PA may be the cancellation signal. That is, nonlinearity components generated by the PA may previously be identified and cancelled using the values given by the PA. This is not limited to the aforementioned embodiment.

Next, the UE may perform SI cancellation on the basis of the signal related to transmission data, the signal related to reception data and the cancellation signal (S1750). At this time, as described in FIGS. 1 to 16, self-interference cancellation should be performed considering an influence of the PA in the legacy FDR mode, and there is limitation in that frequency domain analysis in the multicarrier system is unavailable. Therefore, the influence of the PA may be reduced using the cancellation signal that cancels the nonlinearity component on the basis of the values given by the PA, whereby frequency domain analysis may be available as described above.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. Also, although the preferred embodiments of the present specification have been described as above, the present specification is not limited to the aforementioned specific embodiment, and various modifications can be made in the embodiments of the present specification by those skilled in the art to which the present invention pertains without departing from the subject matter of the present specification. These modifications should not be understood individually from technical spirits or aspects.

In this specification, both the product invention and the method invention have been described, and description of both inventions may be made complementally if necessary.

What is claimed is:

1. A method for canceling a self-interference (SI) signal by a user equipment (UE) operating in a full duplex radio (FDR) mode in a wireless communication system, the method comprising:
generating, by the UE, a signal related to transmission data;
transmitting, by the UE, the generated signal;
receiving, the UE, a signal related to reception data;
canceling, by the UE, the SI signal based on the generated signal and the received signal; and
generating, by the UE, a cancellation signal from the generated signal based on a previously set value of a power amplifier (PA),
wherein the SI signal is canceled by reflecting the generated cancellation signal.

2. The method according to claim 1, wherein the SI signal is canceled in a time domain.

3. The method according to claim 1, further comprising performing, by the UE, Fast Fourier Transform (FFT) processing for the generated cancellation signal.

4. The method according to claim 3, wherein the SI signal is canceled in a frequency domain based on the generated cancellation signal for which the FFT processing is performed.

5. The method according to claim 1, further comprising performing, by the UE, error estimation for the generated cancellation signal.

6. The method according to claim 5, further comprising updating, by the UE, the cancellation signal based on the error estimation.

7. The method according to claim 1, wherein the SI cancellation is applied to a multicarrier system.

8. The method according to claim 7, wherein:
the cancellation signal is generated for each subcarrier of the multicarrier system; and
the SI signal is canceled in a frequency domain based on the cancellation signal generated for each subcarrier.

9. The method according to claim 1, wherein the previously set value of the power amplifier is given by a datasheet of the PA.

10. The method according to claim 9, wherein the previously set value of the PA is given based on parameters of the PA.

11. A user equipment (UE) operating in a full duplex radio (FDR) mode and canceling a self-interference (SI) signal in a wireless communication system, the UE comprising:
a reception module configured to receive signals;
a transmission module configured to transmit signals; and
a processor configured to:
generate a signal related to transmission data;
control the transmission module to transmit the generated signal;
control the reception module to receive a signal related to reception data;
cancel the SI signal based on the generated signal and the received signal; and
generate a cancellation signal from the generated signal based on a previously set value of a power amplifier (PA),
wherein the SI signal is canceled by reflecting the generated cancellation signal.

12. The UE according to claim 11, wherein the SI signal is canceled in a time domain.

13. The UE according to claim 11, wherein the processor is further configured to perform Fast Fourier Transform (FFT) processing for the generated cancellation signal.

14. The UE according to claim 13, wherein the SI signal is canceled in a frequency domain based on the generated cancellation signal for which the FFT processing is performed.

15. The UE according to claim 11, wherein the processor is further configured to perform error estimation for the generated cancellation signal.

16. The UE according to claim 15, wherein the processor is further configured to update the cancellation signal based of the error estimation.

17. The UE according to claim 11, wherein the SI cancellation is applied to a multicarrier system.

18. The UE according to claim 17, wherein:
the cancellation signal is generated for each subcarrier of the multicarrier system; and
the SI signal is canceled in a frequency domain based on the cancellation signal generated for each subcarrier.

19. The UE according to claim 11, wherein the previously set value of the power amplifier is given by a datasheet of the PA.

20. The UE according to claim 19, wherein the previously set value of the PA is given based on parameters of the PA.

* * * * *